United States Patent Office 3,419,623
Patented Dec. 31, 1968

3,419,623
PROCESS FOR THE PRODUCTION OF 1-(o-CHLOROPHENYL)2,2,2-TRICHLOROETHANOL
Ivan C. Nordin, Ann Arbor, Mich., assignor to Parke, Davis & Company, Detroit, Mich., a corporation of Michigan
No Drawing. Filed Aug. 29, 1966, Ser. No. 575,550
4 Claims. (Cl. 260—618)

ABSTRACT OF THE DISCLOSURE

Process for the production of 1-(o-chlorophenyl)-2,2,2-trichloroethanol by reacting o-chlorobenzaldehyde with a trichloromethyl compound, such as chloroform or an amine adduct of chloral, in the presence of an alkali metal hydride and neutralizing the resulting product. The process product is useful as an intermediate in the preparation of 1,1-dichloro-2-(o-chlorophenyl)-2-(p-chlorophenyl)ethane, a compound useful in the treatment of adrenocortical carcinoma.

Summary of the invention

The present invention relates to a process for the production of 1-(o-chlorophenyl) - 2,2,2 - trichloroethanol, which can be represented by the formula

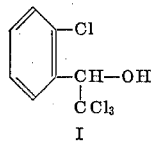
I

More particularly, the invention relates to a process for the production of 1-(o-chlorophenyl)-2,2,2-trichloroethanol by reacting o-chlorobenzaldehyde with a trichloromethyl compound having the formula R—CCl$_3$
(II)

in the presence of a metal hydride having the formula

M—H
(III)

and neutralizing the resulting product; where M represents an alkali metal and R represents hydrogen or an aminocarbinol group having the formula

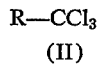
IV where R$_1$ and R$_2$ are each lower alkyl or are combined and together with the nitrogen atom to which they are attached represent a heterocyclic group, such as pyrrolidino, piperidino, and morpholino. The preferred trichloromethyl compound and metal hydride, because of their ready availability and convenience in use, are chloroform (Formula II, R=H) and sodium hydride (Formula III, M=sodum), respectively.

In accordance with the invention, 1-(o-chlorophenyl)-2,2,2-trichloroethanol is produced by reacting o-chlorobenzaldehyde with a trichloromethyl compound having Formula II in the presence of a metal hydride having Formula III in an inert, anhydrous, non-hydroxylic solvent at a temperature between about 0 and 30° C., and then neutralizing the resulting product. Suitable solvents that may be used include halogenated hydrocarbons, such as carbon tetrachloride, aromatic hydrocarbons, such as benzene and toluene, and various ethers, such as dioxane and tetrahydrofuran, as well as mixtures of these. The preferred solvent is tetrahydrofuran. When the trichloromethyl compound is chloroform, an excess of this reactant may be used as solvent, in which case added solvent may be omitted. Since the reaction is exothermic, it is best to apply external cooling to maintain the temperature below about 30° C., at least untl the evolution of hydrogen, which is a secondary product of the reaction, ceases. The duration of the reaction is not critical and will vary depending on the temperature and reactants employed. The reaction is essentially complete when hydrogen evolution ceases. To insure completion, however, it is best to allow the reacton to proceed for an additional 10-20 hours at about room temperature after the cessation of hydrogen evolution. Although equivalent quantities of the three reactants may be used, best results are obtained when the trichloromethyl compound and metal hydride are used in moderate excess. Upon completion of the first stage of the process, the reaction product mixture is neutralized. The neutralization is best accomplished by adding sufficient cold mineral acid, preferably hydrochloric acid, to bring the reaction mixture to pH 6–7. The purpose of this neutralization step is to convert the intermediate salt product obtained from the first stage, having the formula

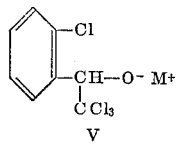
V where M has the aforementioned significance, to the desired 1-(o-chlorophenyl)-2,2,2-trichloroethanol product.

The trichloromethyl compound of Formula II wherein R is an aminocarbinol group as defined above, that is used as a reactant in the foregoing process, is most conveniently prepared in situ by reacting an amine compound having the formula

R$_1$R$_2$NH with chloral in the chosen reaction solvent medium at a temperature below 0° C.

The 1-(o-chlorophenyl)-2,2,2-trichloroethanol product produced by the process of the invention is useful as a chemical intermediate. As such, for example, it can be converted by reaction with chlorobenzene in concentrated sulfuric acid to 1,1,1-trichloro-2-(o-chlorophenyl)-2-(p-chlorophenyl)ethane, which, in turn, can be converted by reaction with aluminum amalgam in ethanol to 1,1-dichloro-2-(o-chlorophenyl) - 2-(p-chlorophenyl)ethane, a compound that is useful in the treatment of adrenocortical carcinoma.

The invention is illustrated by the following examples.

EXAMPLE 1

A sodium hydride dispersion (53% in mineral oil; 100 g.) is washed three times by decantation with toluene to remove the mineral oil, the toluene-wet sodium hydride is added all at once to a mixture consisting of 281.2 g. of o-chlorobenzaldehyde, 264 g. of chloroform, and 2 liters of tetrahydrofuran, and the resulting mixture is stirred for 2 hours at 25±3° C. and then overnight at room temperature. The mixture is then treated with 500 g. of ice and sufficient hydrochloric acid to change the pH to 6, and the aqueous mixture is concentrated to small volume, and then extracted with ether. The combined ether extracts are washed with water, with saturated aqueous sodium bicarbonate, and with water again, dried, evaporated, and the residue distilled to give 1-(o-chlorophenyl)-2,2,2-trichloroethanol; B.P. 144–150° C./7 mm. Hg.

EXAMPLE 2

To a solution of 160.8 g. of diethylamine in 500 ml.

of tetrahydrofuran, cooled to −5° C., is added 324 g. of chloral, while the temperature is maintained below 0° C. The resulting cold solution is added all at once at 5° C. to a stirred mixture consisting of 281.2 g. of o-chlorobenzaldehyde, 1500 ml. of tetrahydrofuran, and 53 g. of sodium hydride (obtained as in Example 1 above from 100 g. of a 53% dispersion in mineral oil), the reaction mixture is stirred and cooled below 10° C. until hydrogen evolution ceases, and is then stirred at room temperature overnight. The mixture is then treated with 500 g. of ice and enough hydrochloric acid to change the pH to 6, concentrated to remove tetrahydrofuran, and the aqueous residue is extracted with ether. The ether extract is washed with water, with saturated aqueous sodium bicarbonate, and with water again, dried, evaporated, and the residue distilled to give 1-(o-chlorophenyl)-2,2,2-trichloroethanol.

In the foregoing procedure, the same product is obtained when pyrrolidine (156.4 g.), piperidine (187.3 g.), or morpholine (191.7 g.) is substituted for the diethylamine.

What is claimed is:

1. Process for the production of 1-(o-chlorophenyl)-2,2,2-trichloroethanol, which comprises reacting o-chlorobenzaldehyde with a trichloromethyl compound having the formula $$R-CCl_3$$

in the presence of a metal hydride having the formula $$M-H$$

and neutralizing the resulting product; where M represents an alkali metal and R represents a member of the class consisting of hydrogen and an aminocarbinol group having the formula $$R_1R_2N-\overset{\overset{\displaystyle OH}{|}}{C}H-$$

where $R_1$ and $R_2$ are members of the class consisting of lower alkyl and further members wherein $R_1$ and $R_2$ are combined with the nitrogen atom to which they are attached to represent a heterocyclic group chosen from the class consisting of pyrrolidino, piperidino, and morpholino.

2. Process according to claim 1 wherein the trichloromethyl compound is chloroform.

3. Process according to claim 1 wherein the trichloromethyl compound is chloroform and the metal hydride is sodium hydride.

4. Process according to claim 1 wherein o-chlorobenzaldehyde is reacted with chloroform in the presence of sodium hydride in an inert, anhydrous, non-hydroxylic solvent at a temperature between 0 and 30° C. and the resulting product is neutralized with mineral acid.

References Cited

UNITED STATES PATENTS 3,274,227  9/1966  Viehe _____ 260—618

FOREIGN PATENTS 685,133  12/1952  Great Britain.

OTHER REFERENCES

Howard et al., J. Am. Chem. Soc. vol. 57, pp. 376–77 (1935).

Lombard et al., Bull. Soc. Chim. France No. 10, C23 (1953).

Swamer et al., J. Am. Chem. Soc. vol. 68 pp. 2647–9 (1946).

LEON ZITVER, *Primary Examiner.*

M. GLYNN, *Assistant Examiner.*

U.S. Cl. X.R.

260—247.7, 326.8, 294.7